Oct. 23, 1928.  1,689,148
E. H. McCLOUD
AUTOMOBILE BUMPER AND TIRE CARRIER
Filed Jan. 23, 1928  3 Sheets-Sheet 1

Inventor
EDWARD H. McCLOUD,
By Toulmin & Toulmin,
Attorneys

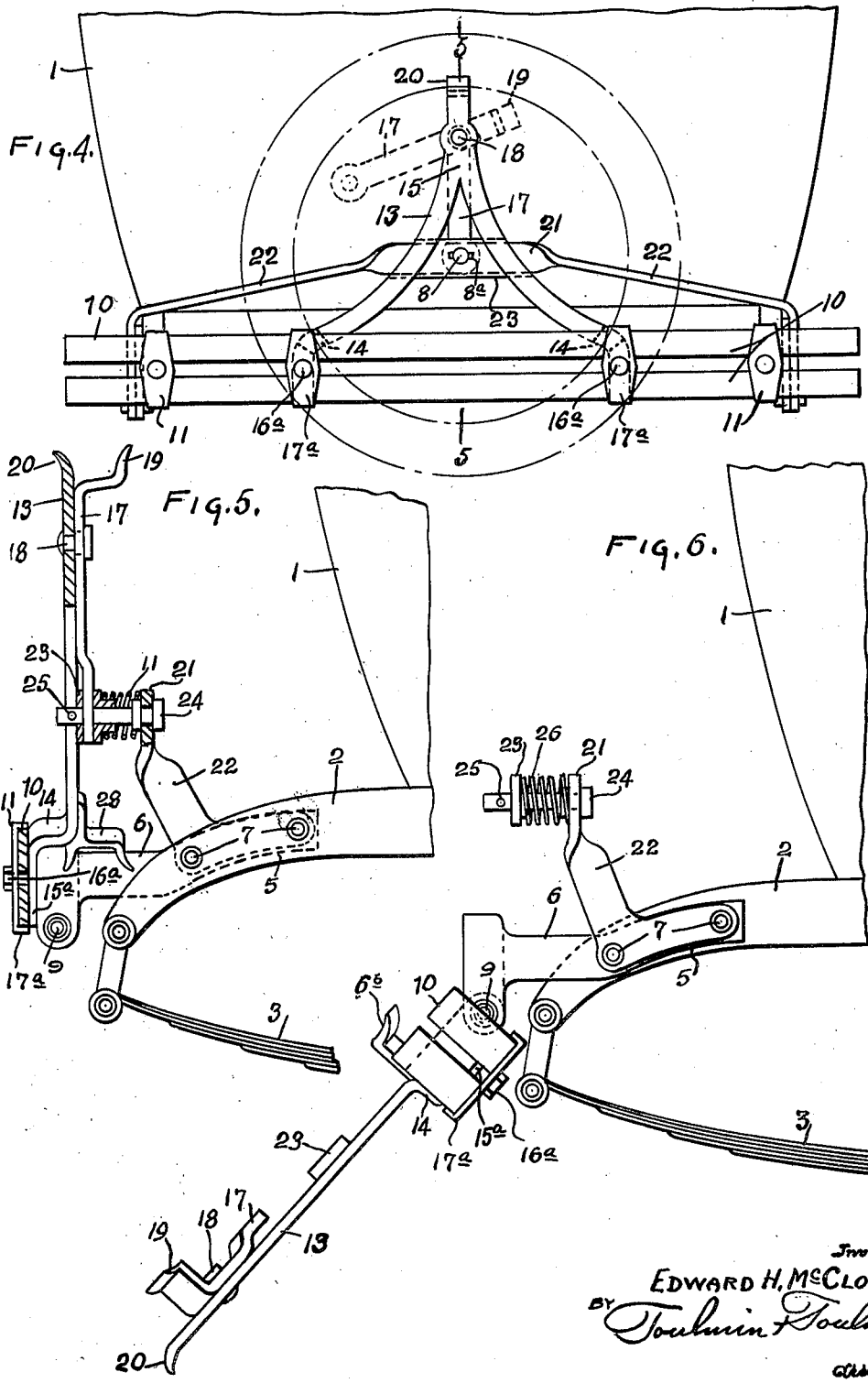

Oct. 23, 1928.
E. H. McCLOUD
1,689,148
AUTOMOBILE BUMPER AND TIRE CARRIER
Filed Jan. 23, 1928     3 Sheets-Sheet 3
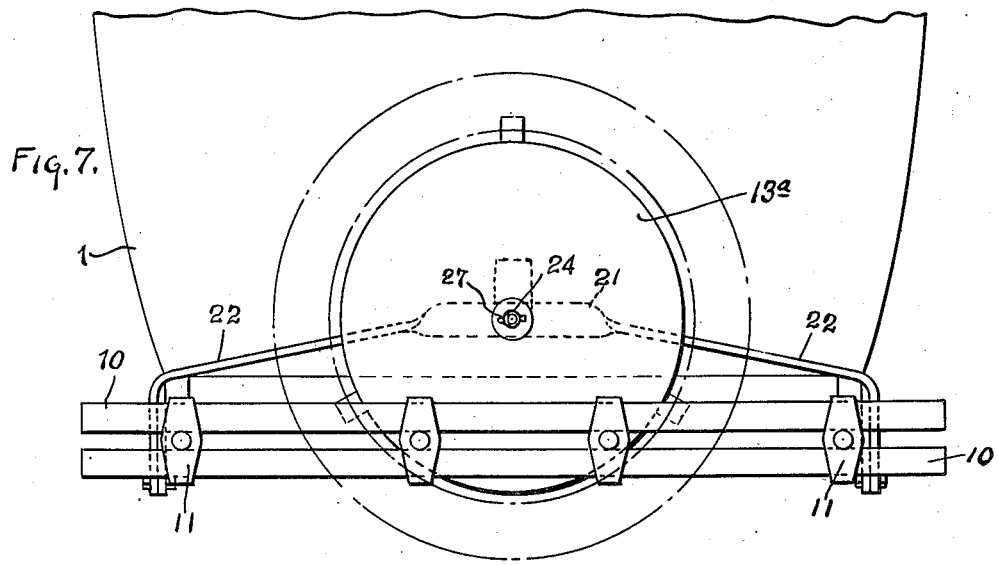
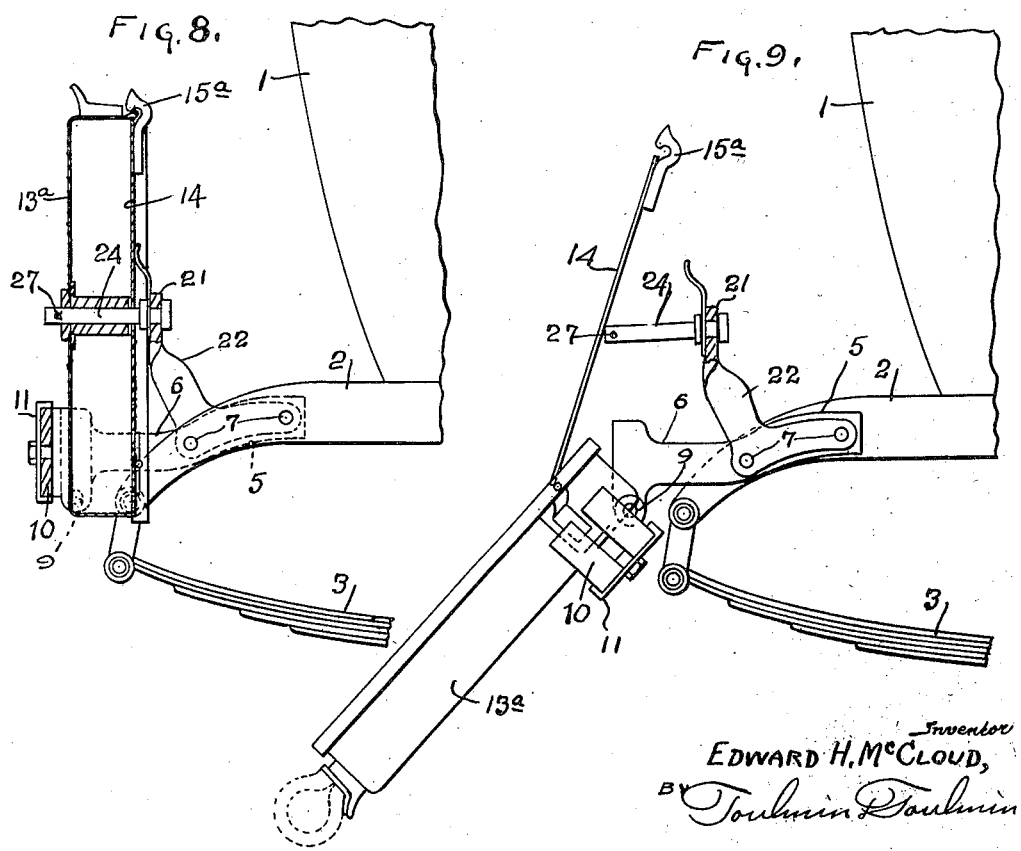
Inventor
EDWARD H. McCLOUD,
BY Toulmin & Toulmin
Attorneys Patented Oct. 23, 1928.

1,689,148

UNITED STATES PATENT OFFICE.

EDWARD H. McCLOUD, OF COLUMBUS, OHIO, ASSIGNOR TO THE CENTRAL BRASS & FIXTURE COMPANY, OF SPRINGFIELD, OHIO, A CORPORATION OF OHIO.

AUTOMOBILE BUMPER AND TIRE CARRIER.

Application filed January 23, 1928. Serial No. 248,668.

This invention relates to an automobile bumper and tire carrier, the bumper and carrier being movably mounted upon an automobile chassis so that ready access may be had to the carrier for the loading and unloading of a tire.

A further object is to provide a bumper and tire carrier, both of which are pivotally connected to the automobile and are interconnected so as to be movable together as a unit.

The invention will be understood from a reference to the accompanying drawings, in which Figure 1 represents a rear elevation of an automobile with this invention applied thereto.

Figure 4 is a rear elevation showing a modified form of the invention.

Figure 5 is a partial side elevation vertical sectional view, taken on line 5—5 of Fig. 4, showing such modified form of the invention.

Figure 6 is a view similar to Figure 5, but showing the parts in unloading position.

Figure 7 is a rear elevation showing another modified form of the invention.

Figure 8 is a view similar to Figure 5 but showing a modified form of tire carrier, in the nature of a box having a cover.

Figure 9 is a side elevation of this modified form in unloading position.

Figure 1:
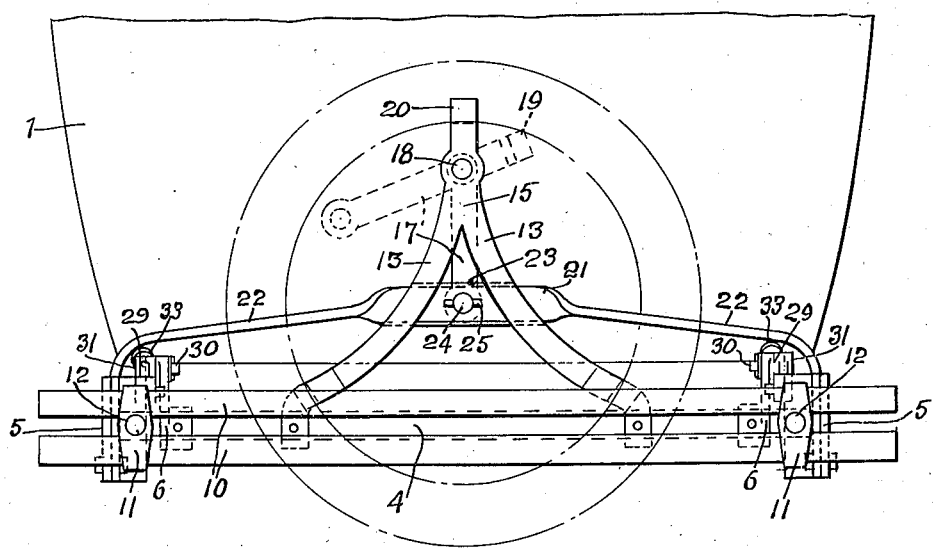

Referring to the drawings, the numeral 1 designates the body of an automobile mounted on the usual chassis indicated at 2, supported upon the leaf springs 3. I mount a fixed crossbar 4 on the chassis bars 2, and secure to the chassis bars a fixed bracket 5 having a rearwardly extending arm 6. Each chassis bar carries one of these brackets. They are held by the rod 4 and securing devices in the nature of bolts and nuts indicated at 7. To each of the arms 6 of these brackets I pivot a link 8 by means of bolts or rivets 9. To these links 8 I secure the rear bumper indicated at 10 by the use of clamps 11 and bolts or rivets 12. Preferably I make the bumper in the form of two bars as seen more clearly in Figure 1. Thus the bumper is made capable of being adjusted from the normal or protecting position, such as shown in Figs. 1, 2, 4 and 5, to a position, occupied when the tire is to be mounted on or removed from the carrier, as seen in Figs. 3, 6 and 9.

Figure 2:
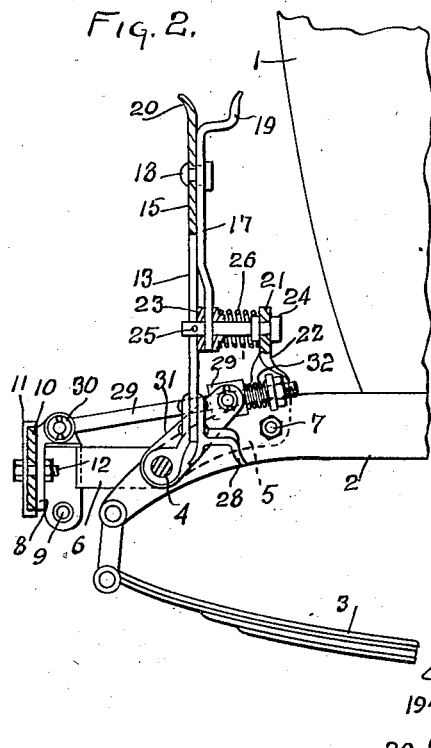
Figure 2 is a partial side elevation and vertical sectional view, taken on the line 2—2 of Fig. 1, showing the carrier and bumper in normal position.
Figure 3:
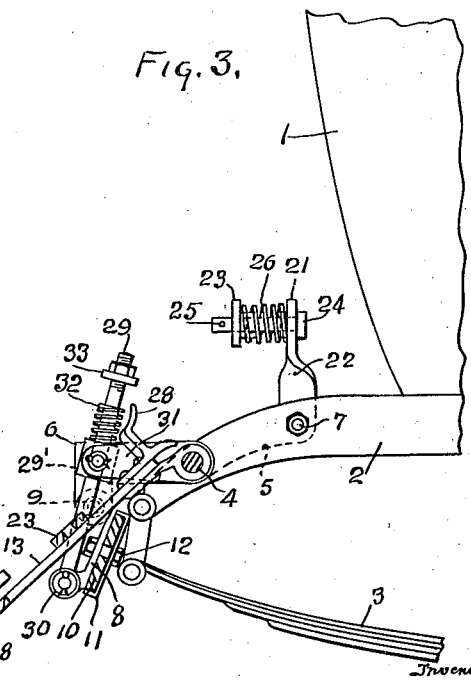
Figure 3 is a similar view showing the carrier and bumper in unloading position.

I also mount on the crossbar 4, in the preferred form shown in Figures 1, 2 and 3, the extra tire carrier composed of the curved bars 13. The upper portion of the bars 15 carries a latch bar 17 mounted on a pivot 18 and fashioned at its upper end with an offset 19 which with the offset 20 of the upper ends of the bars 13 forms a tire holder.

In order to lock the carrier in carrying position such as shown, for instance, in Figs. 1 and 2, I further provide an arched bar 21 which extends across the machine and terminates in portions 22 secured to the chassis bars 2 by the bolts 7. This arched bar carries a locking bolt 24 which extends through a cross plate 23 secured to the carrier bars 13. A retaining pin 25 prevents the cross plate from slipping backward off of the bolt. A spring 26 on the bolt 24 acts to prevent the parts from rattling by its expansive action.

Thus the carrier is locked in its carrying or upper position as shown, for instance, in Fig. 2. When it is desired to lower the carrier in order to unload a tire or place a tire thereon, a fastening device 17 is removed and the carrier is swung downward from the normal position in Fig. 2 to the unloading or loading position shown in Figure 3. A companion piece for holding the tire on the carrier is shown at 28, and acts in conjunction with the holder 19, 20, to maintain the tire. By swinging the bar 17 to one side as indicated in Fig. 1, the tire will be released from the carrier.

I will now refer to the means for interconnecting the bumper and the carrier to cause the bumper to swing down and out of the way when the carrier is swung down. The preferred form of this means consists of rods 29 pivotally connected to the links 8 at the point 30 and extending thence through a cuff member 29' pivotally mounted on the end of the swinging arms 31 mounted on the crossbar 4 and adapted to move or swing when the carrier proper is swung from one position to the other. A coil spring 32 on the rod 29 is placed between the arm 31 and an enlargement on the rod 29 in the nature of a washer and nut indicated at 33. These springs keep the connecting parts under tension when the bumper is in protecting position such as shown in Fig. 2, and yet permit the rods to slide in the arms 31 during any adjustment from normal to unloading position, as seen in Fig. 3.

Thus it will be understood that in the form of the invention embodied in Figs. 1, 2 and 3, there is a feature of yieldability in the connection between the bumper and the carrier, but nevertheless a positive connection between them, so that a movement of the carrier brings about a corresponding movement of the bumper whereby the bumper will be removed to a position which will not interfere with the removal of tires from and the mounting of tires on the carrier, as clearly seen in Figure 3.

Referring to Figures 4, 5 and 6, in the drawings I will now describe the first modification of my invention or the first modified form in which I may carry it into effect. The essential difference between this form and that embodied in Figures 1, 2 and 3 is in the manner of interconnecting the carrier and the bumper. In this modified form the connecting rod 29 and its parts are omitted and the carrier instead of being mounted on the fixed crossbar 4 is mounted on the bumper itself. The curved bar 13 of the carrier is bent or directed near its lower end, as seen at 14, best illustrated in Fig. 5, and carried thence down at the back of the bumper as indicated at 15ª. The carrier 13 is thus positioned and fastened to the bumper bars as by means of bolts and clamps 16ª and 17ª utilized in interconnecting the bars of the bumper to each other. Of course, the carrier 13 may be otherwise connected to the bumper but this is the preferred manner of attachment.

It will now be seen that when the carrier is unlocked from the locking bolt 24 and is swung from normal position as in Figure 5 to unloading or loading position as shown in Figure 6, the bumper will also be moved with the carrier and will be positioned substantially the same as it is positioned as shown in Figure 3. But broadly speaking, in both the preferred form, shown in Figures 1 to 3 inclusive, and in this modified form shown in Figures 4 to 6 inclusive, the bumper is interconnected with the carrier.

Referring to yet another modification, but a very similar one to that shown in Figures 4 to 6, I now make reference to Figures 7, 8, 9. In these figures the carrier is connected to the bumper in the same manner as in Figures 4 to 6, but the carrier itself is of a different type. Instead of the frame like carrier before referred to, I now show a carrier indicated at 13ª in the nature of a casing or circular box composed of a body and a lid. The extra tire or tires will be placed in this casing and prevented from dislodgment by the lid indicated at 14. A suitable catch or fastening device suggested at 15ª is employed to lock the lid to the casing. To secure the casing and its tires in normal position as shown in Figure 8, the locking bolt 24 is extended through the casing with the securing pin 27 inserted through the bolt where it projects beyond the casing. When the pin is removed the casing may be swung down to the loading and unloading position shown in Figure 9, the bumper traveling with the casing and arriving at a position under and forward of the casing corresponding to the position assumed by the bumper in the construction shown in the other figures. Thus the bumper and casing move together and bear such a relation that the bumper will protect the casing when the casing is in normal position, and that the bumper will be out of the way for the removal and mounting of tires from and in the casing when the casing is in unloading and loading position.

And in all of the figures, it will be noted, the weight of the tire when the carrier is being lowered and raised will be essentially borne in part by the pivotal mounting of the carrier and by the person who is manipulating the carrier—about half of the weight falling on the carrier supports, thus lightening the burden on the user.

I desire to comprehend within my invention such modifications as may be clearly embraced within my claims and the scope of my invention.

Having thus fully described my invention, what I claim is new and desire to secure by Letters Patent, is:

1. The combination with an automobile, of a pivotally connected tire carrier and bumper, both movably connected to the automobile.

2. The combination with an automobile chassis, of a tire carrier and bumper, movably connected with relation to each other, both the carrier and bumper being movably connected with the chassis.

3. The combination with an automobile chassis, of an interconnected tire carrier and bumper, both the carrier and bumper being pivotally connected with the chassis.

4. The combination with an automobile chassis, of a tire carrier and bumper movably connected with relation to each other, both the carrier and bumper being pivotally connected with the chassis, and movable together as a unit.

5. The combination with an automobile chassis, of a tire carrier and bumper movably connected with relation to each other, both the carrier and bumper being movably connected with the chassis and means for retaining the bumper and carrier in normal position.

6. The combination with an automobile chassis, of a bumper and tire carrier, both movably connected to the chassis, and a spring pressed rod interconnecting the bumper and tire carrier.

7. The combination with an automobile, and a crossbar carried thereby, of a carrier and an arm pivotally mounted on said bar, brackets secured to the chassis, a bumper pivotally mounted on the brackets and a connecting rod between the bumper and said arm.

8. The combination with an automobile, and a crossbar carried thereby, of a tire carrier and an arm pivotally mounted on the crossbar, an arch bar secured to the chassis and having locking devices to engage and lock the carrier, brackets secured to the chassis and a bumper pivoted to the bracket, and a connecting rod between the bumper and the arm on the cross rod.

9. The combination with an automobile chassis, of two pairs of brackets mounted upon the chassis, a bumper and tire carrier pivotally mounted on one pair of said brackets, and means on the other pair of brackets for retaining the bumper and carrier in normal position.

10. The combination with an automobile of an interconnected bumper and tire carrier having a pivotal connection with the chassis, the carrier being in the form of a casing adapted to receive a spare tire within it.

In testimony whereof, I affix my signature.

EDWARD H. McCLOUD.